US009819938B2

(12) United States Patent
Jia et al.

(10) Patent No.: US 9,819,938 B2
(45) Date of Patent: *Nov. 14, 2017

(54) ENCODING, DECODING, AND REPRESENTING HIGH DYNAMIC RANGE IMAGES

(71) Applicant: Dolby Laboratories Licensing Corporation, San Francisco, CA (US)

(72) Inventors: Wenhui Jia, Dublin, CA (US); Ajit Ninan, San Jose, CA (US); Arkady Ten, Sunnyvale, CA (US); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,689

(22) Filed: Apr. 7, 2017

(65) Prior Publication Data

US 2017/0214917 A1    Jul. 27, 2017

Related U.S. Application Data

(63) Continuation of application No. 14/997,950, filed on Jan. 18, 2016, now Pat. No. 9,654,781, which is a
(Continued)

(51) Int. Cl.
*H04N 19/124* (2014.01)
*H04N 19/186* (2014.01)
(Continued)

(52) U.S. Cl.
CPC ............. *H04N 19/124* (2014.11); *H04N 9/77* (2013.01); *H04N 19/136* (2014.11);
(Continued)

(58) Field of Classification Search
CPC .. H04N 19/124; H04N 19/136; H04N 19/186; H04N 19/182; H04N 19/44; H04N 9/77; H04N 5/2355; H04N 5/355
(Continued)

(56) References Cited

U.S. PATENT DOCUMENTS 4,649,568 A    3/1987 Kiesel
5,414,527 A    5/1995 Koshi
(Continued)

FOREIGN PATENT DOCUMENTS

CN    101626454    1/2010
CN    101816171    8/2010
(Continued)

OTHER PUBLICATIONS

Durand, F., et al., "Fast Bilateral Filtering for the Display of High-Dynamic-Range Images" Proceedings of the 29th Annual Conference of Computer Graphics and Interactive Techniques, San Antonio, Texas, 2002, pp. 257-266.
(Continued)

*Primary Examiner* — Nhan T Tran

(57) ABSTRACT

Techniques are provided to encode and decode image data comprising a tone mapped (TM) image with HDR reconstruction data in the form of luminance ratios and color residual values. In an example embodiment, luminance ratio values and residual values in color channels of a color space are generated on an individual pixel basis based on a high dynamic range (HDR) image and a derivative tone-mapped (TM) image that comprises one or more color alterations that would not be recoverable from the TM image with a luminance ratio image. The TM image with HDR reconstruction data derived from the luminance ratio values and the color-channel residual values may be outputted in an image file to a downstream device, for example, for decod-
(Continued)

ing, rendering, and/or storing. The image file may be decoded to generate a restored HDR image free of the color alterations.

13 Claims, 7 Drawing Sheets

Related U.S. Application Data continuation of application No. 14/677,906, filed on Apr. 2, 2015, now Pat. No. 9,271,011, which is a continuation of application No. 13/938,795, filed on Jul. 10, 2013, now Pat. No. 9,036,042, which is a continuation-in-part of application No. 13/675,643, filed on Nov. 13, 2012, now Pat. No. 8,508,617, which is a continuation of application No. 13/553,440, filed on Jul. 19, 2012, now Pat. No. 8,334,911, which is a continuation of application No. 13/449,119, filed on Apr. 17, 2012, now Pat. No. 8,248,486, which is a continuation of application No. PCT/US2012/033795, filed on Apr. 16, 2012.

(60) Provisional application No. 61/476,174, filed on Apr. 15, 2011, provisional application No. 61/552,868, filed on Oct. 28, 2011.

(51) Int. Cl.
   *H04N 19/44* (2014.01)
   *H04N 9/77* (2006.01)
   *H04N 5/235* (2006.01)
   *H04N 19/136* (2014.01)
   *H04N 19/182* (2014.01)

(52) U.S. Cl.
   CPC ......... *H04N 19/182* (2014.11); *H04N 19/186* (2014.11); *H04N 19/44* (2014.11)

(58) Field of Classification Search
   USPC .................. 348/222.1, 2, 234, 235, 223.1
   See application file for complete search history.

(56) References Cited

U.S. PATENT DOCUMENTS

| | | | |
|---|---|---|---|
| 5,621,660 A | 4/1997 | Chaddha | |
| 5,742,892 A | 4/1998 | Chaddha | |
| 6,282,311 B1 | 8/2001 | McCarthy | |
| 6,282,312 B1 | 8/2001 | McCarthy | |
| 6,282,313 B1 | 8/2001 | McCarthy | |
| 6,285,784 B1 | 9/2001 | Spaulding | |
| 6,301,393 B1 | 10/2001 | Spaulding | |
| 6,335,983 B1 | 1/2002 | McCarthy | |
| 6,748,106 B1 | 6/2004 | Bryant | |
| 6,754,384 B1* | 6/2004 | Spaulding | H04N 1/6058 382/167 |
| 7,289,663 B2 | 10/2007 | Spaulding | |
| 7,583,305 B2 | 9/2009 | McDermott | |
| 7,747,098 B2 | 6/2010 | Ward | |
| 7,756,330 B2 | 7/2010 | Border | |
| 7,826,673 B2 | 11/2010 | Segall | |
| 8,014,445 B2 | 9/2011 | Segall | |
| 8,218,625 B2 | 7/2012 | Ward | |
| 8,537,893 B2 | 9/2013 | Efremov | |
| 8,891,863 B2 | 11/2014 | Ninan | |
| 8,982,963 B2 | 3/2015 | Gish | |
| 2002/0034255 A1 | 3/2002 | Zetts | |
| 2002/0094127 A1 | 7/2002 | Mitchell | |
| 2003/0234944 A1 | 12/2003 | Gindele | |
| 2004/0008267 A1 | 1/2004 | Chen | |
| 2004/0100565 A1 | 5/2004 | Chen | |
| 2005/0259729 A1 | 11/2005 | Sun | |
| 2006/0002467 A1* | 1/2006 | Haskell | H04N 19/124 375/240.03 |
| 2006/0013308 A1 | 1/2006 | Kim | |
| 2006/0158462 A1* | 7/2006 | Toyama | G06T 5/007 345/629 |
| 2008/0192819 A1* | 8/2008 | Ward | H04N 19/126 375/240.02 |
| 2009/0022421 A1 | 1/2009 | Uyttendaele | |
| 2009/0046207 A1 | 2/2009 | Salvucci | |
| 2009/0175338 A1 | 7/2009 | Segall | |
| 2009/0219994 A1* | 9/2009 | Tu | H04N 19/186 375/240.08 |
| 2009/0285283 A1 | 11/2009 | Gao | |
| 2010/0128786 A1 | 5/2010 | Gao | |
| 2010/0172411 A1* | 7/2010 | Efremov | H04N 19/124 375/240.12 |
| 2010/0226547 A1 | 9/2010 | Criminisi | |
| 2010/0272185 A1 | 10/2010 | Gao | |
| 2011/0194618 A1* | 8/2011 | Gish | H04N 19/59 375/240.25 |
| 2011/0254976 A1* | 10/2011 | Garten | H04N 5/232 348/229.1 |
| 2011/0285737 A1* | 11/2011 | Lin | G09G 5/10 382/162 |
| 2012/0314944 A1* | 12/2012 | Ninan | H04N 19/647 382/166 |

FOREIGN PATENT DOCUMENTS

| | | |
|---|---|---|
| EP | 1341123 | 9/2003 |
| EP | 1743301 | 1/2007 |
| EP | 1871113 | 12/2007 |
| JP | 3-222577 | 10/1991 |
| JP | 2003-158635 | 5/2003 |
| JP | 2004-029639 | 1/2004 |
| JP | 2006-019847 | 1/2006 |
| JP | 2006-157453 | 6/2006 |
| JP | 5249784 | 6/2009 |
| JP | 2009-171062 | 7/2009 |
| JP | 2009-224971 | 10/2009 |
| JP | 2010-213360 | 9/2010 |
| KR | 10-1007101 | 1/2011 |
| RU | 2341906 | 12/2008 |
| RU | 2415454 | 3/2011 |
| TW | 201033994 | 9/2010 |
| WO | 2005/104035 | 11/2005 |
| WO | 2007/082562 | 7/2007 |
| WO | 2009/087952 | 7/2009 |
| WO | 2010/082692 | 7/2010 |
| WO | 2012/004709 | 1/2012 |

OTHER PUBLICATIONS

Erdem, A. Tanju, et al., "Compression of 10-bit Video Using the Tools of MPEG-2", Signal Processing: Image Communication, vol. 7, 1995, pp. 27-56.

Khan, Ishtiaq Rasool, "Two Layer Scheme for Encoding of High Dynamic Range Images" 2008 IEEE, p. 1169-1172.

Kuhna, M. et al "Method for Evaluating Tone Mapping Operators for Natural High Dynamic Range Images" Proc. SPIE 7876, Jan. 24, 2011, p. 11.

Lin, H.Y., et al., "High Dynamic Range Imaging for Stereoscopic Scene Representation" ICIP 2009 p. 4305-4308.

Okuda, M., et al., "Two-Layer Coding Algorithm for High Dynamic Range Images Based on Luminance Compensation" May 18, 2007.

Segall, A. et al "System for Bit-Depth Scalable Coding" JVT Meeting, MPEG Meeting JTC1/SC29/WG11 and ITU-T SG.16, Apr. 25, 2007.

Spaulding, K., et al., "Extending the Color Gamut and Dynamic Range of an sRGB Image Using a Residual Image", Color Research and Application, vol. 28, No. 4, Aug. 2003, pp. 251-266.

Spaulding, K., et al., "Using a Residual Image to Extend the Color Gamut and Dynamic Range of an sRGB Image", Eastman Kodak Company, 2003, pp. 1-9.

(56) References Cited

OTHER PUBLICATIONS

Ward, G., et al., "JPEG-HDR: A Backwards-Compatible, High Dynamic Range Extension to JPEG" Proceedings of the Thirteenth Color Imaging Conference, Nov. 2005.
Ward, G., et al., "Subband Encoding of High Dynamic Range Imagery" Proceedings of the 1st Symposium on applied perception in graphics and visualization, Los Angeles, California, 2004, pp. 83-90.
Winken, M. et al "Bit-Depth Scalable Video Coding" IEEE International Conference on Image Processing, Sep. 1, 2007, pp. 1-5.
Xu, R., et al., "High Dynamic Range Still-Image Encoding in JPEG 2000" IEEE Computer Graphics and Applications 2005, p. 57-64.

\* cited by examiner

ENCODING, DECODING, AND REPRESENTING HIGH DYNAMIC RANGE IMAGES

CROSS-REFERENCE TO RELATED APPLICATIONS

This application is a continuation and claims the benefit of priority to U.S. patent application Ser. No. 14/997,950 filed on Jan. 18, 2016, which is a continuation of U.S. patent application Ser. No. 14/677,906, filed on Apr. 2, 2015 (and issued as U.S. Pat. No. 9,271,011), which is a continuation of U.S. patent application Ser. No. 13/938,795, filed on Jul. 10, 2013 (and issued as U.S. Pat. No. 9,036,042), which is a continuation-in-part of U.S. patent application Ser. No. 13/675,643 filed on Nov. 13, 2012 (and issued as U.S. Pat. No. 8,508,617), which is a continuation of U.S. patent application Ser. No. 13/553,440, filed on Jul. 19, 2012 (and issued as U.S. Pat. No. 8,334,911 on Dec. 18, 2012), which is a continuation of U.S. patent application Ser. No. 13/449,119, filed on Apr. 17, 2012 (and issued as U.S. Pat. No. 8,248,486 on Aug. 21, 2012), which is a continuation of International Patent Application No. PCT/US2012/033795 filed 16 Apr. 2012, which claims priority to U.S. Provisional Patent Application Ser. No. 61/476,174 filed on Apr. 15, 2011 and U.S. Provisional Patent Application Ser. No. 61/552,868 filed on Oct. 28, 2011, all of which are hereby incorporated by reference in their entirety.

TECHNICAL FIELD

The present invention relates generally to image processing and, in particular, to encoding, decoding, and representing high dynamic range images.

BACKGROUND OF THE INVENTION

Display technologies being developed by the assignee, and others, are able to reproduce images having high dynamic range (HDR). Such displays can reproduce images that more faithfully represent real-world scenes than conventional displays.

To support backwards compatibility as well as new HDR display technologies, an HDR image may be represented by a tone-mapped image with additional metadata comprising grayscale luminance ratios. On one hand, the tone-mapped image may be used to present a normal dynamic range image (e.g., on a legacy display). On the other hand, the additional metadata may be used with the tone-mapped image to generate, recover, or present an HDR image (e.g., by an HDR display).

However, a tone-mapped image may comprise one or more color alterations caused for various reasons in connection with a user who is manipulating the image or with a particular tone mapping operator used to generate the tone-mapped image. For example, the user may change hue information related to some or all of the pixels in the image in order to create a more artistic looking image. In addition, a tone-mapping operator may perform different black or white clippings in various color channels, and may introduce color alterations, for example, in relatively underexposed or overexposed regions of the image. Under existing techniques, these color alterations in the tone-mapped image are difficult or impossible to remove when a downstream decoder tries to reconstruct an HDR image from a tone-mapped image and accompanying grayscale luminance ratios.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1:
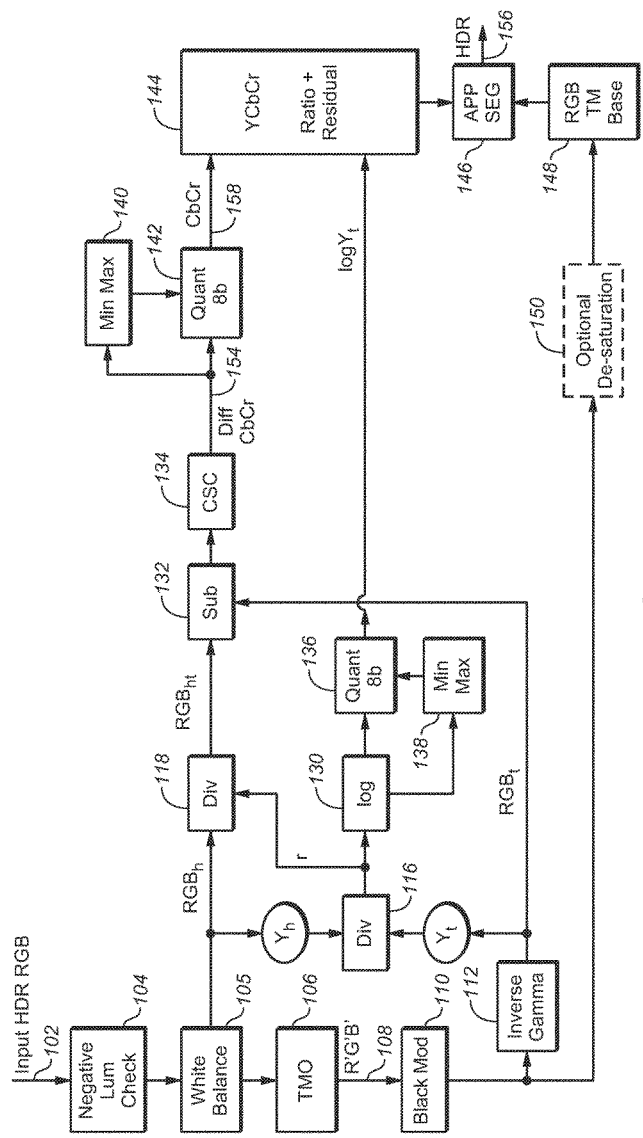
FIG. 1 illustrates an example HDR image encoder, in accordance with some possible embodiments of the present invention.

Example possible embodiments, which relate to image processing techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. HDR IMAGE ENCODER
3. WHITE BALANCE CORRECTION
4. HDR IMAGE DECODER
5. EXAMPLE PROCESS FLOW
6. IMPLEMENTATION MECHANISMS—HARDWARE OVERVIEW
7. EQUIVALENTS, EXTENSIONS, ALTERNATIVES AND MISCELLANEOUS

1. GENERAL OVERVIEW

This overview presents a basic description of some aspects of a possible embodiment of the present invention.

It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

To display images on a wide variety of image rendering devices, tone mapping operators (TMOs) process input HDR images into tone mapped (TM) base images. The TM base images may comprise color alterations (e.g., hue changes, color clippings, artistic looks, etc.) relative to the input image. Under some techniques, TM base images are provided to downstream image decoders along with luminance ratios to reconstruct HDR images equivalent to the input HDR images. However, a downstream image decoder would not be able to remove color alterations in a reconstructed HDR image, relying on a TM base image and gray scale luminance ratios. As a result, the color alterations would remain noticeable in the reconstructed HDR image.

In contrast, an HDR image encoder under techniques described herein creates not only luminance ratios but also color residual values based on an input HDR image and a TM base image. The luminance ratios and color residual values may be collectively denoted as HDR reconstruction data. Optionally and/or additionally, the luminance ratios are transformed into a logarithmic domain to support a relatively wide range of luminance values. Optionally and/or additionally, the resultant logarithmic luminance ratios and the color residual values are quantized. Optionally and/or additionally, the quantized logarithmic ratios and color residual values are stored in a residual image. The quantized logarithmic ratios and color residual values, or the residual image in some embodiments, are provided with the TM base image to a downstream image decoder. Optionally and/or additionally, parameters related to the quantized logarithmic ratios and color residual values (e.g., range limits, etc.) are also provided with the TM base image.

A TMO herein may freely perform color clippings in color channels for individual pixels with low (black) or high (white) luminance levels. Also, a TMO as described herein is not required to maintain hue at each pixel. Under techniques described herein, a user is free to select a TMO based on image content (e.g., human figures, an indoor image, an outdoor scene, a night view, a sunset, etc.) or applications (e.g., used in a movie, a poster, a wedding photo, a magazine, etc.). Color clippings or modifications may be deliberately and freely used to create artistic looks of images. HDR image encoders and decoders herein support TMOs implemented by different types of editing software and camera makers that may introduce a wide range of possible color alterations. Under techniques described herein, the HDR encoders provide color residual values to the HDR decoders. The HDR decoders in turn make use of the color residual values to prevent (or minimize) the color alterations from being present in reconstructed HDR images.

Under techniques described herein, bit streams and/or image files may be used to store and provide TM base images and their respective HDR reconstruction data to downstream image viewers or decoders for decoding and/or rendering. An image format under techniques described herein supports TMOs implemented by different types of editing software and camera makers. Examples of image formats described herein may include, but are not limited to, standard JPEG image formats (including, for example, JPEG-HDR), etc. In an example embodiment, a JPEG-HDR image format is used to support storing a TM base image with luminance ratios and color residual values. Additionally and/or optionally, one or both of the TM base image and the residual image stored in an image file are compressed. Compression as described herein may be performed using the JPEG standard or a different method.

An image decoder or viewer not supporting HDR image processing under techniques described herein simply opens the TM base image in an image file. On the other hand, HDR image decoders under techniques described herein are configured to read/parse the image file into the TM base image and its corresponding luminance ratios and color residual values and to restore/reconstruct an HDR image. The reconstructed HDR image described herein is free of color alterations that were absent from an original input HDR image but were introduced into the TM base image by a TMO.

In some possible embodiments, mechanisms as described herein form a part of an image encoder, including but not limited to a handheld device, game machine, theater system, home entertainment system, television, laptop computer, netbook computer, cellular radiotelephone, electronic book reader, point of sale terminal, desktop computer, computer workstation, computer kiosk, and various other kinds of terminals and processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. HDR IMAGE ENCODER

FIG. 1 illustrates an example HDR image encoder, in accordance with some possible embodiments of the present invention. In some possible embodiments, the HDR image encoder is implemented by one or more computing devices, and configured with software and/or hardware components that implement image processing techniques for encoding an input HDR image into a TM image with HDR reconstruction data in a standard-based or proprietary image format.

The HDR image encoder comprises software and/or hardware components configured to receive an input HDR image. As used herein, an "input HDR image" refers to any HDR image that may comprise floating-point or fixed-point high dynamic range image data. The input HDR image may be in any color space that supports a high dynamic range color gamut. In an example embodiment, the input HDR image is an RGB image (e.g., Input HDR RGB 102 as illustrated in FIG. 1) in an RGB color space. In an example, each pixel in the input HDR image comprises floating-point pixel values for all channels (e.g., red, green, and blue color channels in the RGB color space) defined in the color space. In another example, each pixel in the input HDR image comprises fixed-point pixel values for all channels (e.g., 16 bits or higher/lower numbers of bits fixed-point pixel values for red, green, and blue color channels in the RGB color space) defined in the color space. Each pixel may optionally and/or alternatively comprise downsampled pixel values for one or more of the channels in the color space.

In an example embodiment, the HDR image encoder comprises software and/or hardware components configured to perform a number of pre-processing steps. Optionally and/or alternatively, the pre-processing steps include, but are not limited, to zero or more sanity checks on the input HDR image, etc. For example, an input HDR image may or may not comprise pixel values implying negative luminance values, for example, introduced by an upstream step or by local data corruption introduced in encoding or transmission. To prevent an underlying luminance value from being negative thereby causing problems in subsequent tone mapping operations, underlying luminance values in the input HDR image are checked with a sanity check (Negative Lum Check 104). If an underlying luminance value of a pixel is not positive, pixel values for all the color channels of the pixel may be set to zero.

In possible embodiments in which a luminance value is not directly given for a pixel in a color space, a luminance value for the pixel may be (indirectly) derived from pixel values of the pixel in the color space. In an example embodiment, pixel values, R, G, and B, in a RGB color space for a pixel may be used to compute the luminance value, Y, for the pixel, as follows:

$$Y = 0.30078125 * R + 0.59765625 * G + 0.1015625 * B \quad \text{expression (1)}$$

Before the input HDR image, which may or may not be preprocessed, is provided to a tone mapping operator (TMO 106), the input HDR image data is passed through a white balance operator (105). As will be discussed in greater detail below, correcting and/or adjusting the white balance in HDR images may be desirable as a part of HDR encoding as well as prior to tone mapping operation.

In an example embodiment, the TMO 106 comprises software and/or hardware components configured to generate, based on the input HDR image (which may be preprocessed), a tone mapped (TM) image that may be rendered on a wide variety of display devices. Under techniques described herein, the TMO 106 is treated as a black box in the HDR image encoder. The TMO 106, or a user who employs the TMO 106 to manipulate the input HDR image, may freely introduce one or more color alterations that affect hues or chroma properties in some or all portions of the output TM image from the TMO 106. Under techniques described herein, the TM image with the color alterations freely made by the TMO 106 or user may be provided as a base image to downstream devices, along with HDR reconstruction data created under the techniques described herein that may be used to reproduce/render the HDR image. The HDR reconstruction data provides sufficient information to a recipient downstream device to reproduce the HDR image free of the color alterations made by the TMO 106.

Optionally and/or alternatively, the HDR image encoder comprises software and/or hardware components (Black Mod 110) configured to perform black modifications on the output of the TMO 106, the TM image (R'G'B' 108). The HDR image encoder, or Black Mod 110 therein, locates zero pixel values in the TM image (R'G'B' 108). In an example, if a pixel value for a color channel is zero, the pixel value is given a small value such as 1, 2, 10, or another larger or smaller value. In another example, if the luminance value for a pixel is zero, the pixel values for one or more color channels are given small values such as 1, 2, 10, or other larger or smaller values. A small pixel value (e.g., below 10) may not make a visual difference perceptually.

The TM image (R'G'B' 108) may or may not be an 8-bit gamma corrected image. For the purpose of illustration only, the tone mapped image (R'G'B' 108) outputted by the TMO 106 has been gamma corrected within the TMO 106. Optionally and/or alternatively, the HDR image encoder comprises software and/or hardware components (Inverse Gamma 112) configured to convert the tone mapped image (R'G'B' 108) to an intermediate tone-mapped image (RGB$_t$) in a linear domain if an output parameter or a return value of the TMO 106 indicates that gamma correction has been performed within the TMO 106. The gamma curve used for gamma correction and/or for gamma conversion may be related to a standard color space such as sRGB or AdobeRGB, which may be indicated by the TMO 106 using one or more output parameters or return values. In an example embodiment, RGB$_t$ may be used to further derive luminance ratios and residual values as described herein.

In an example embodiment, luminance values (Y$_h$) in the input HDR image (RGB$_h$) and luminance values (Y$_t$) in RGB$_t$ may be calculated. In some possible embodiments, Y$_h$, Y$_t$, and luminance ratios (r) between Y$_h$ and Y$_t$, may be calculated on an individual pixel basis as follows:

$$Y_h = L(RGB_h) = 0.30078125 * R_h + \\ 0.59765625 * G_h + 0.1015625 * B_h$$

$$Y_t = L(RGB_t) = 0.30078125 * R_t + \\ 0.59765625 * G_t + 0.1015625 * B_t$$

$$r = \frac{Y_h}{Y_t}$$

expressions (2)

Where Y$_h$ comprises a plurality of luminance values each corresponding to a different pixel in the input HDR image, Y$_t$ comprises a plurality of luminance values each corresponding to a different pixel in the tone-mapped image, and r comprises a plurality of luminance ratios each of which is defined as a ratio between a luminance value in Y$_h$ and a corresponding luminance value in Y$_t$. In some possible embodiments, Y$_h$, Y$_t$, and r may be expressed with matrices of the same dimensionality. A position in a matrix described herein, as indicated by a row index and a column index, may indicate a pixel in an image (e.g., the input HDR image, the tone mapped image, or a luminance ratio image formed by r). Luminance values from Y$_h$ and Y$_t$ and the luminance ratios from r correspond to one another if their positions share the same row index and the same column index in the matrices. In an alternative embodiment, the division operations (Div 116) as illustrated in FIG. 1 for computing r based on Y$_h$ and Y$_t$ are performed as subtractions in a logarithmic domain.

Under techniques as described herein, the luminance ratios r are computed using the tone mapped image (RGB$_t$) that comprises the outcome of color alteration operations performed by the TMO 106 or the user. The luminance ratios as computed in expressions (2), when multiplying the tone-mapped image, produce an image whose luminance values match the luminance values of the input HDR image.

If color balance is maintained by the TMO 106 and if there is no color clipping performed with the tone-mapped image by the TMO 106 or the user, a combined image created by a multiplication of the tone-mapped image with the luminance ratios r matches the input HDR image color by color.

On the other hand, if the tone mapped image comprises color alterations/distortions, for example, when the color balance in the input HDR image is changed by the TMO 106 in the tone mapped image, or if color clipping occurs in the white balance 105 or TMO 106, the combined image created by a multiplication of the tone-mapped image with the luminance ratios r does not match the input HDR image color by color. Under the techniques described herein, differences in color channels other than the luminance channel are computed between the combined image and the input HDR image to produce residual values included in HDR reconstruction data. The HDR reconstruction data generated under the techniques described herein provides extra color information that was lost in the white balance 105 or TMO 106 or in the operations performed by the user. When a downstream device such as an HDR image decoder or an HDR rendering device receives the TM image with the color alterations/distortions and the HDR reconstruction data, the color alterations/distortions in the TM image are compensated with the HDR reconstruction data.

As used herein, clipping refers to a type of color alternation that alters/modifies out-of-bound pixel values in color channels so that the resultant pixel values are within represented ranges. Clipping may happen to any color channels (e.g., R, G, and B pixel values in a RGB color space in a certain portion of the HDR image may be clipped in the TM image). Amounts of clipping may or may not vary with the color channels (e.g., more clipping for green, less clipping for blue, etc.).

Using the luminance ratios r, the input HDR image may be re-mapped to generate an intermediate re-mapped image ($RGB_{ht}$) whose color balance is not changed. $RGB_{ht}$ may be calculated with a division operation (Div 118) as follows:

$$RGB_{ht} = \frac{RGB_h}{r} \qquad \text{expression (3)}$$

As explained above, if color balance was maintained by the TMO 106 and if there is no color clipping, the re-mapped image ($RGB_{ht}$) will be the same as the tone mapped image ($RGB_t$). Otherwise, there will be differences in these two images. The differences between the two images are residual values in the tone mapping image space (e.g., a space comprising all possible tone mapped images). In an example embodiment, the residual values ($RGB_e$) are calculated with subtractions (Sub 132) in the linear domain as follows:

$$RGB_e = RGB_{ht} - RGB_t \qquad \text{expression (4)}$$

The residual values ($RGB_e$) may be converted (by a CSC 134 block illustrated in FIG. 1) to an $YC_bC_r$ color space. Under techniques herein, the tone mapped image ($RGB_t$) and the re-mapped image ($RGB_{ht}$) have the same luminance values. The luminance residual values between these two images are all zeros. The residual values ($RGB_e$) in the $YC_bC_r$ color space comprise only chroma information (Diff $C_bC_r$ 154) that needs to be saved. The conversion from $RGB_e$ to Diff $C_bC_r$ may be given as follows:

$$\begin{bmatrix} Y_e \\ Cb_e \\ Cr_e \end{bmatrix} = M_{csc} * \begin{bmatrix} R_e \\ G_e \\ B_e \end{bmatrix} \qquad \text{expression (5)}$$

Where $M_{CSC}$ and its inverse $M_{CSC}^{-1}$ may be a 3×3 matrix defined as follows:

$$M_{csc} = \begin{bmatrix} 0.30078125 & 0.59765625 & 0.1015625 \\ -0.16739 & -0.3326 & 0.5 \\ 0.5 & -0.42737 & -0.0726 \end{bmatrix} \qquad \text{expressions (6)}$$

$$M_{csc}^{-1} = \begin{bmatrix} 1.0 & 0.0 & 1.3984 \\ 1.0 & -0.3054 & -0.7038 \\ 1.0 & 1.7969 & 0.0 \end{bmatrix}$$

Under techniques as described herein, the conversion coefficients used to compute luminance values in the input HDR image and the tone mapped image are exactly the same as those in $M_{CSC}$ in the expressions (5) and (6). Under these techniques, luminance residual values ($Y_e$) in $RGB_e$ are all zeros, as shown below:

$$\begin{aligned} Y_e &= L(RGB_e) \qquad \text{expressions (7)} \\ &= L(RGB_{ht} - RGB_t) \\ &= L(RGB_{ht}) - L(RGB_t) \\ &= \frac{L(RGB_h)}{r} - L(RGB_t) \\ &= \frac{Y_h}{r} - Y_t \\ &= 0 \end{aligned}$$

The luminance ratios r in the linear domain, as computed in expressions (2), have a wide range, because the ratios carry HDR information of the input image. In an example embodiment, for efficient quantization purposes, as illustrated in expression (8) below, the luminance ratios r are first converted (e.g., by a log block 130 of FIG. 1) to a logarithm domain. The maximum and minimum luminance ratio values in the logarithmic domain may be used to determine a logarithmic range (e.g., by a Min Max block of FIG. 1) with the upper limit and lower limit as $lr_{max}$ and $lr_{min}$, respectively. The logarithmic luminance ratios may then be quantized (e.g., uniformly or according to a particular curve) (e.g., by a Quant 8b 136 block of FIG. 1) into 8-bit values Log $Y_t$ (or H in expression (8)) based on the logarithmic range.

In an example, natural logarithm is used with the logarithmic domain. In other examples, logarithm with other bases other than that of natural logarithm is used with the logarithmic domain. In another embodiment, for efficient mapping purposes, the luminance ratios r may be represented by a linear or non-linear transform other than logarithm (e.g., a square root or the like). Such a transform may be characterized by a lookup table. In an embodiment, a coded representation of this lookup table may be saved as side information together with the image data so it can be used by a decoder for decoding.

$$\begin{aligned} lr &= \log(r) \qquad \text{expressions (8)} \\ lr_{min} &= \min lr \\ lr_{max} &= \max lr \\ H &= \left( \frac{lr - lr_{min}}{lr_{max} - lr_{min}} \right) * 255. \end{aligned}$$

In some embodiments, the log ratio image lr may be dithered to reduce potential artifacts in the decoded image. In an embodiment, to reduce banding, the least significant bits of the log ratio image are disturbed by a randomly generated pattern, preferably in the range [−0.5, 0.5); however, any other dithering algorithm known in the art may be applied. In an embodiment, a random number generator may be implemented by a 32-bit linear feedback shift register (LFSR) with taps at [32, 22, 2, 1], whose characteristic polynomial is given by $x^{32}+x^{22}+x^2+x^1+1$; however, any other random number generator known in the art may be applied. The last four bits of the LFSR (e.g., bits 29-32), after proper normalization to the desired dithering range (e.g., [0, 1) or [−0.5, 0.5)), may be added to the log ratio image lr before quantization to generate the quantized ratio image H.

In an example $YC_bC_r$ color space, $C_b$ and $C_r$ residual values (denoted as U and V in expressions (9) and (10)) in Diff $C_bC_r$ may be normalized and quantized to 8-bit values ($C_bC_r$ 158), respectively, in a similar manner, as follows:

$$Cb = \frac{Cb}{Y_t}$$
$$Cb_{min} = \min Cb$$
$$Cb_{max} = \max Cb$$
$$U = \left(\frac{Cb - Cb_{min}}{Cb_{max} - Cb_{min}}\right) * 255$$

expressions (9)

$$Cr = \frac{Cr}{Y_t}$$
$$Cr_{min} = \min Cr$$
$$Cr_{max} = \max Cr$$
$$V = \left(\frac{Cr - Cr_{min}}{Cr_{max} - Cr_{min}}\right) * 255$$

expressions (10)

In an embodiment, a dithering method similar to the one described earlier for the log ratio image, may also be applied to the normalized chroma residual values Cb and Cr before generating the quantized U and V values.

In an example embodiment, after quantization, the HDR reconstruction data comprises three sets of two-dimensional data, H, U, and V (Log $Y_t$ and $C_bC_r$ 158 in FIG. 1). The sets of data in the HDR reconstruction data may be saved/stored in a single $YC_bC_r$ container 144 (e.g., a YUV image) comprising the luminance ratio values (in the luminance channel of the example YUV color space) and the residual values (in the chroma difference channels of the example YUV color space), as if they form an (e.g., YUV) image. At the end, two images may be obtained. One is a tone mapped image in the RGB color space, and the other is the HUV image in the YUV color space. The tone mapped image may be the output (R'G'B' 108) of the TMO 106, after black modification (Black Mod 110) and/or with optional de-saturation (e.g., 150). Both tone mapped and HUV images may comprise 8-bit data, and may be compressed, for example, using a JPEG standard compression method. The HDR reconstruction data may be outputted in an application segment (APP SEG 146) with the tone mapped image in a single image file. The single image file may be in a standard-based or proprietary image file format (e.g., JPEG-HDR). The application segment may be a marker field (e.g., APP11 marker) in the image file format (e.g., as defined by the JPEG standard). In an example, the TM image forms a base image (RGB TM Base 148) after JPEG compression, and the HUV image is attached to the TM base image in an application segment (APP SEG 146) such as APP11 marker in an output HDR (e.g., 156) image file.

Techniques as described herein may be used to process both floating-point and fixed-point HDR images (e.g., a 16-bit linear image, a 14-bit gamma-corrected image, etc.).

In an example embodiment, the TM base image and the HUV image are stored in a standard JPEG format under JPEG-HDR techniques, commercially available from Dolby Laboratories, San Francisco, Calif. The TM base image is stored into an entropy coded data segment. The HUV image with parameters and auxiliary data is stored in an application segment such as APP11 application segment under JPEG-HDR, with an appropriate ID string (e.g., "DD").

Minimum and maximum values of quantization value ranges in the HUV may be stored in a type I segment. These minimum and maximum values include the maximum and minimum luminance ratio values in the logarithmic domain, the maximum and minimum values for $C_b$ residual values, and the maximum and minimum values for $C_r$ residual values. Optionally and/or alternatively, other information specifying the base image color space (e.g., sRGB, AdobeRGB) and residual mode (e.g., luminance ratio only) is included in the type I segment. If the residual mode is luminance ratio only, $C_b$ and $C_r$ related parameters and data may be ignored in later decoding.

In an example embodiment, the HUV image is stored in a type II segment, and may be split into multiple type II segments with index information in a header of the segments, if the data size of the HUV image exceeds a certain size e.g., 64 k bytes.

3. WHITE BALANCE CORRECTION

Oftentimes, a user captures an image with a digital camera and it is desired to render an HDR image derived from the captured image. If the Camera RAW format of the camera capturing the image were known, then it may be possible to create an HDR image with high chroma fidelity. However, post-hoc white balancing may be difficult to perform correctly using standard JPEG for at least two reasons: (1) the exact mapping from rendered color space back to sensor colors is not known, and (2) clamping has been applied unequally to different color channels. Without knowing how to get to a color space that is linearly related to the original sensor values, white balance correction cannot be done well.

If however, the Camera RAW format is known, it is possible to utilize the camera RAW formatting to adjust exposure and white balance after the fact (i.e., after the images are captured by the camera). While standard JPEG images can have their brightness boosted to some degree, it is not possible to recover lost highlights, and white-balancing either increases overall image brightness or causes highlights to become colored to some degree. One embodiment of the present system, however, affords the ability to adjust exposure and white balance of JPEG-HDR images and may have advantages over standard JPEG and (in many cases) camera RAW image encodings.

A standard image encoding, such as JPEG or 24-bit TIFF, has in practice a maximum representable value in each channel of (255, 255, 255) which corresponds to "white." So long as the exposure and white balance of the camera are correctly set, the reproduced image will be acceptable for normal viewing and printing purposes. However, if the image is slightly over-exposed, or the white balance is improperly set by the user or by the camera's firmware, it will be difficult to correct the image during post-processing. Once a primary value has been clipped to 255, the information used to recover the original color would tend to be lost.

Although there is no widely adopted standard for Camera RAW, most such formats contain enough information at each pixel to make modest adjustments to exposure and white balance. By recording the original sensor A/D output values, it is possible to know nearly as much as the camera did when the image was taken. In particular, it is possible to tell when each sensor saturated, which allows the possibility of adjusting the exposure and white balance within the captured range.

In fact, if Camera RAW files are available then the situation is aided, for two reasons: (1) Camera RAW has a little extra headroom in each channel beyond "white", and (2) Camera RAW tells us exactly when each channel clips, so it is possible to take notice not to surpass this maximum in the output mapping. So, typically, post-hoc white point correction works in Camera RAW because (1) the linear sensor color space and range is known, and (2) no information has been lost to clamping. Any rendered white point available at the time of capture is available from the Camera RAW data.

In fact, if white balance is performed in Camera RAW, the resulting image is the original image as the steps taken by the camera in firmware are repeated—but possible performed in stand-alone software. However, there are limits to how much of the highlight information can be recovered. For example, in some cases, if one of the channels has reached its maximum value in this patch, the RAW converter may clip the other two to assure a neutral result.

Clamping color primaries to the wrong white point makes post-hoc correction problematic even if we do know how to get to linear values, because the full range of sensor data has been compromised. Such post-hoc processing may end up either discoloring new highlights or raising image brightness in a manner that desaturates color and loses detail elsewhere.

Figure 5:
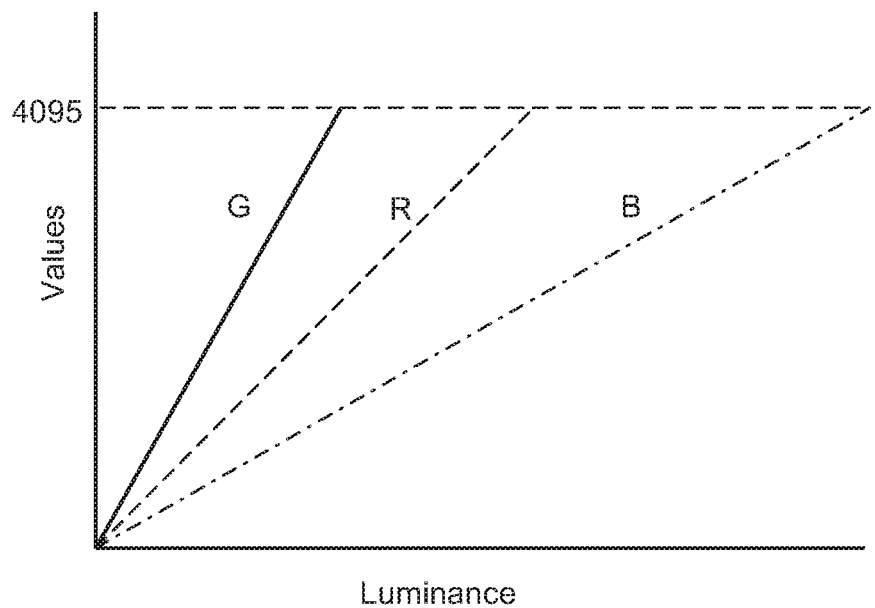
FIG. 5 illustrates the varying saturation characteristics of different color sensors in a typical camera over a gradient of black to white.

The situation is illustrated by FIG. 5. FIG. 5 represents a graph of a hypothetical digital camera's performance in capturing image data in a black-to-white gradient. According to the graph of FIG. 5, the digital image captured in the green channel saturates at a first white luminance value (at digital value 4095), and then the red channel saturates at a higher white luminance value. The blue channel, however, takes a much higher white luminance value in order for it to saturate. Without knowing these points at which the various color channels saturate, correcting for a proper white balance is particularly tricky.

Extension of JPEG-HDR

JPEG-HDR was created as an extension of the JPEG standard in order to enable the storage of high dynamic range images. With the existing format for JPEG-HDR, JPEG-HDR has effectively two image channels that affect a white balance correction—namely, the base layer (tone-mapped) JPEG image and a residual layer that may be utilized to recover a calibrated linear color space—thus, conferring many of the advantages of Camera RAW. The additional dynamic range in fact allows the system to correct color values beyond what is rendered in the base layer. However, it may be desirable to add some additional information in the case where the captured range does not cover the full range of scene values, as is frequently the case even for HDR.

In one embodiment, the system may store the upper sensor range for the captured HDR in each of the RGB color channels. This may take the form of 2 or 3 white balance scaling factors and a matrix (e.g. 3×3) that produces effective linear sensor values in a nominal (e.g. 0-1) range. The "effective linear sensor values" may be construed to be the full range of a hypothetical sensor that could capture in a single exposure what may be merged from multiple exposures in a HDR capture. These effective linear sensor values may be used to produce the sensor color space values of such hypothetical sensor. The "white balance scaling factors" (or "white balance multipliers") may be used to inform the system as to what the original white balance setting was during conversion—i.e. the one used to get the current output.

In another embodiment, a change may be made to JPEG-HDR to allow the highlights of the recovered HDR image to extend beyond the usual maximum to non-white values—where one or more effective sensor values have reached their upper limit. Because these pixels may be rendered as white in the tone-mapped base layer, the new $C_bC_r$ color residual channels as described further herein may be utilized.

When an application requests the recombined HDR image from a JPEG-HDR file, white clamping may then be performed. This may be accomplished by transforming the HDR image back to the "effective linear sensor values" and applying the (corrected) white balance multipliers. In one embodiment, these multipliers may be normalized so that the smallest of the three channel multipliers is exactly 1. This may be followed by a clamping step where any sensor*multiplier values>1 are clipped to 1. Finally, the modified effective sensor values at each pixel may be transformed back into to the target color space using the inverse of the supplied sensor matrix.

Figure 6A:
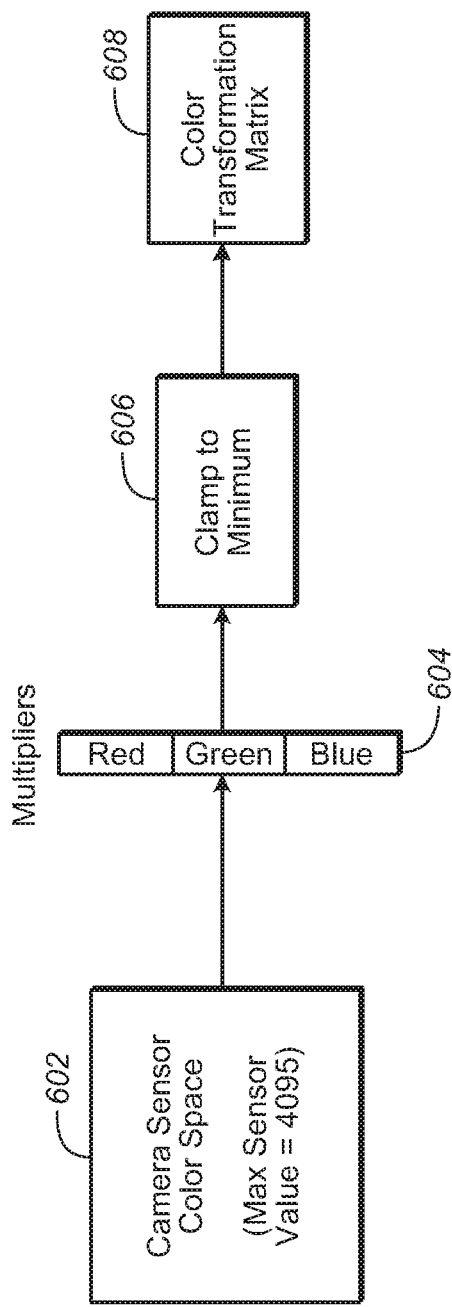
FIGS. 6A and 6B illustrate embodiments of a present system that transforms image data from camera sensor color space to monitor color space that performs post-hoc white balance.
Figure 6B:
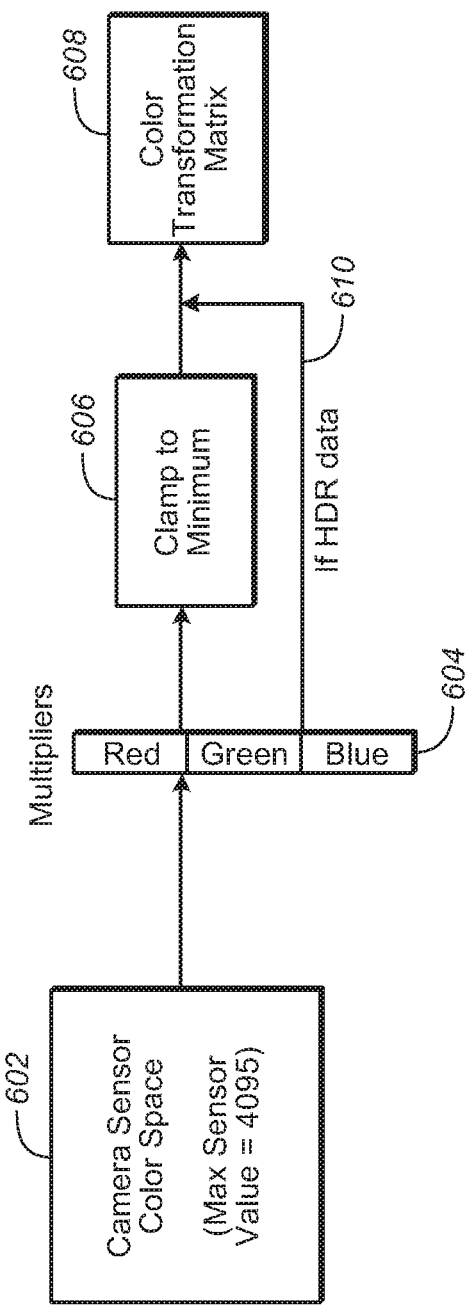

In yet another embodiment, an optimization may check to see if HDR pixel values are large enough to approach clamping. If a pixel is within the captured gamut boundary, then no clamping is needed and the two color transformations and white adjustment may be combined into one transform. This will be the identity matrix in cases where the original white balance is unaltered. Since most pixels may be within the captured gamut, this may reduce the computation requirements for this method. If re-rendering of the tone-mapped base layer is desired, the corrected and clamped HDR thus created may then be used as the source for recomputing the tone-mapped image To illustrate some of the above discussion, FIG. 6A shows one possible set of mapping operations from a camera sensor color space to a monitor color space in this fashion. Camera sensor color space 602 sends image data to the color channel multipliers 604. In order to guarantee a white point, clamp to minimum value 606 may be employed before these values are input into color transformation matrix 608 for rendering onto a target monitor. FIG. 6B presents a different embodiment of a possible set of mappings. As may be seen, if the image captured is in HDR format, then clamping at 606 may be bypassed (610) and the values may be fed directly into color transformation matrix 608. With either of the embodiments of FIGS. 6A and/or 6B, the output of transformation matrix 608 may be output from White Balance operator 105 in FIG. 1 along the HDR path to Div 118 and $Y_h$ block.

In one embodiment, the camera may be able to guess (possibly with or without user input) as to the ambient lighting conditions under which the image was captured to affect, say for example, a Tungsten white balance, or a daylight white balance. This may be taken into consideration for the proper settings of the color channel multipliers. Alternatively, if there is no such information in the camera settings, then having the user make an appropriate guess on a post-hoc basis or choosing a neutral (gray reference) surface in the image may suffice.

4. HDR IMAGE DECODER

Figure 2:
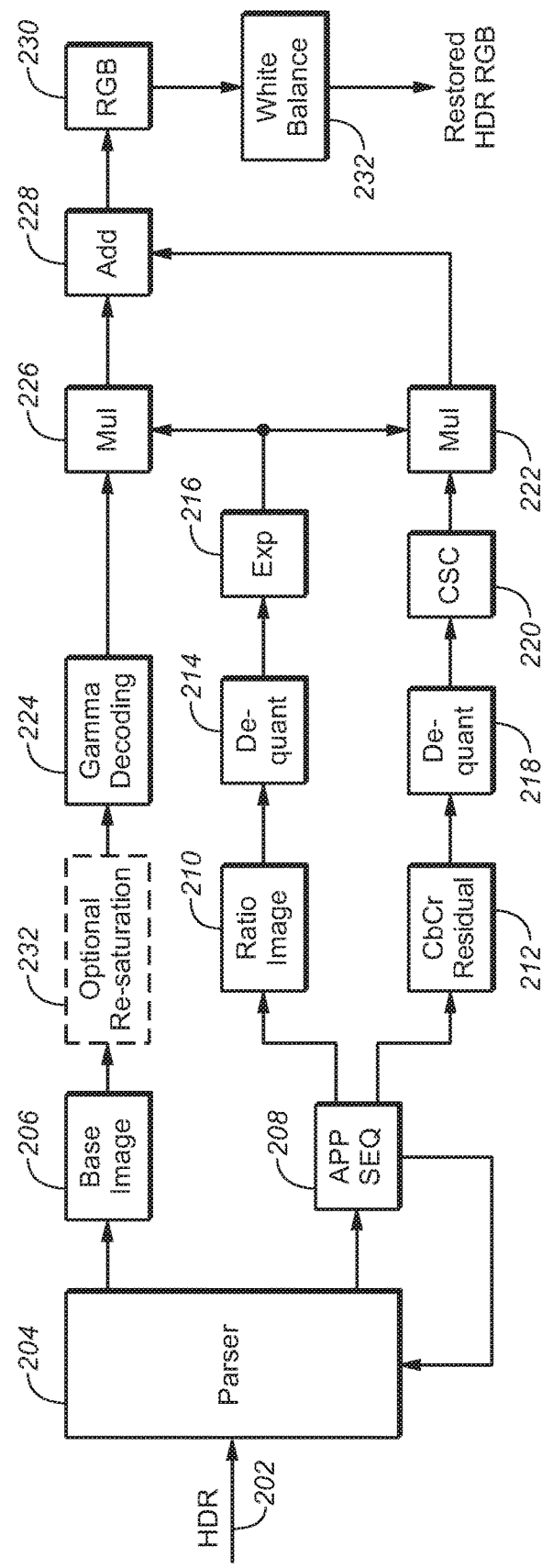
FIG. 2 illustrates an example HDR image decoder, in accordance with some possible embodiments of the invention.

FIG. 2 illustrates an example HDR image decoder, in accordance with some possible embodiments of the present invention. In an example embodiment, the HDR image decoder is implemented by one or more computing devices, and configured with software and/or hardware components that implement image processing techniques for decoding HDR image data (denoted as HDR 202 in FIG. 2) comprising a tone mapped base RGB image and HDR reconstruction data. In an example embodiment, HDR reconstruction data refers to luminance ratio values, Cb and Cr residual values, and parameters and auxiliary data related to the foregoing data. In an example embodiment, the image data to be decoded by the HDR image decoder is in an image file in an image format (e.g., JPEG-HDR).

The HDR image decoder may comprise a parser (e.g., 204) configured to receive the HDR image data 202 (e.g., an JPEG-HDR image file in an enhanced format to store Cb and Cr residual values in addition to luminance ratios), and to parse the HDR image data 202 into the tone mapped base RGB image (denoted as Base Image 206 in FIG. 2) and one or more application segments (APP SEG 208) storing the HDR reconstruction data. In an example embodiment, the parser 204 is a standard JPEG decoder.

In an example embodiment, the HDR image decoder comprises software and/or hardware components configured to parse the one or more application segments (APP SEG 208) into a luminance ratio image (Ratio Image 210) and quantized Cb and Cr residual values (CbCr Residual 212). The luminance ratio image (Ratio Image 210) comprises quantized logarithmic luminance ratios.

In an example embodiment, the HDR image decoder comprises a de-quantization processing block (De-quant 214) configured to de-quantize the quantized logarithmic luminance ratios into logarithmic luminance ratios. The HDR image decoder comprises an inverse logarithm processing block (exp 216) configured to convert logarithmic luminance ratios into luminance ratios in a non-logarithmic domain.

In an example embodiment, the HDR image decoder comprises a de-quantization processing block (De-quant 218) configured to de-quantize and denormalize the quantized Cb and Cr residual values into Cb and Cr residual values. The HDR image decoder comprises a color space conversion processing block (CSC 220) configured to convert Cb and Cr residual values into RGB residual values in the linear domain.

In an example embodiment, the HDR image decoder comprises a re-saturation block (232) configured to perform the inverse process of de-saturation, optionally and/or additionally, if the tone mapped base image is de-saturated by the encoder. In an example embodiment, the HDR image decoder comprises a gamma decoding processing block (Gamma Decoding 224) configured to perform gamma decoding on the tone mapped base RGB image (Base Image 206), optionally and/or additionally, if the tone mapped base image (Base Image 206) is gamma encoded. For example, a parameter in a type I segment of an application segment may indicate that the tone mapped based image is a gamma encoded RGB image (e.g., sRGB image).

The output of the gamma decoding processing block (Gamma Decoding 224) is multiplied with the luminance ratios from the ratio image on individual pixel basis to derive an intermediate HDR image in a Mul processing block 226, while the RGB residual values are multiplied with the same luminance ratios from the ratio image on individual pixel basis to derive a RGB residual image in a Mul processing block 222 (which may be the same as 226). The intermediate HDR image and the RGB residual image may be summed on individual pixel basis by a summing processing block (Add 228) to derive an HDR RGB image (RGB 230), which may be a restored version of the input HDR RGB image in FIG. 1.

In an alternative embodiment, pixel values in the TM base image and the RGB residual values are summed first. The results of the summations are then multiplied by the luminance ratios to derive the HDR RGB image.

Figure 7:
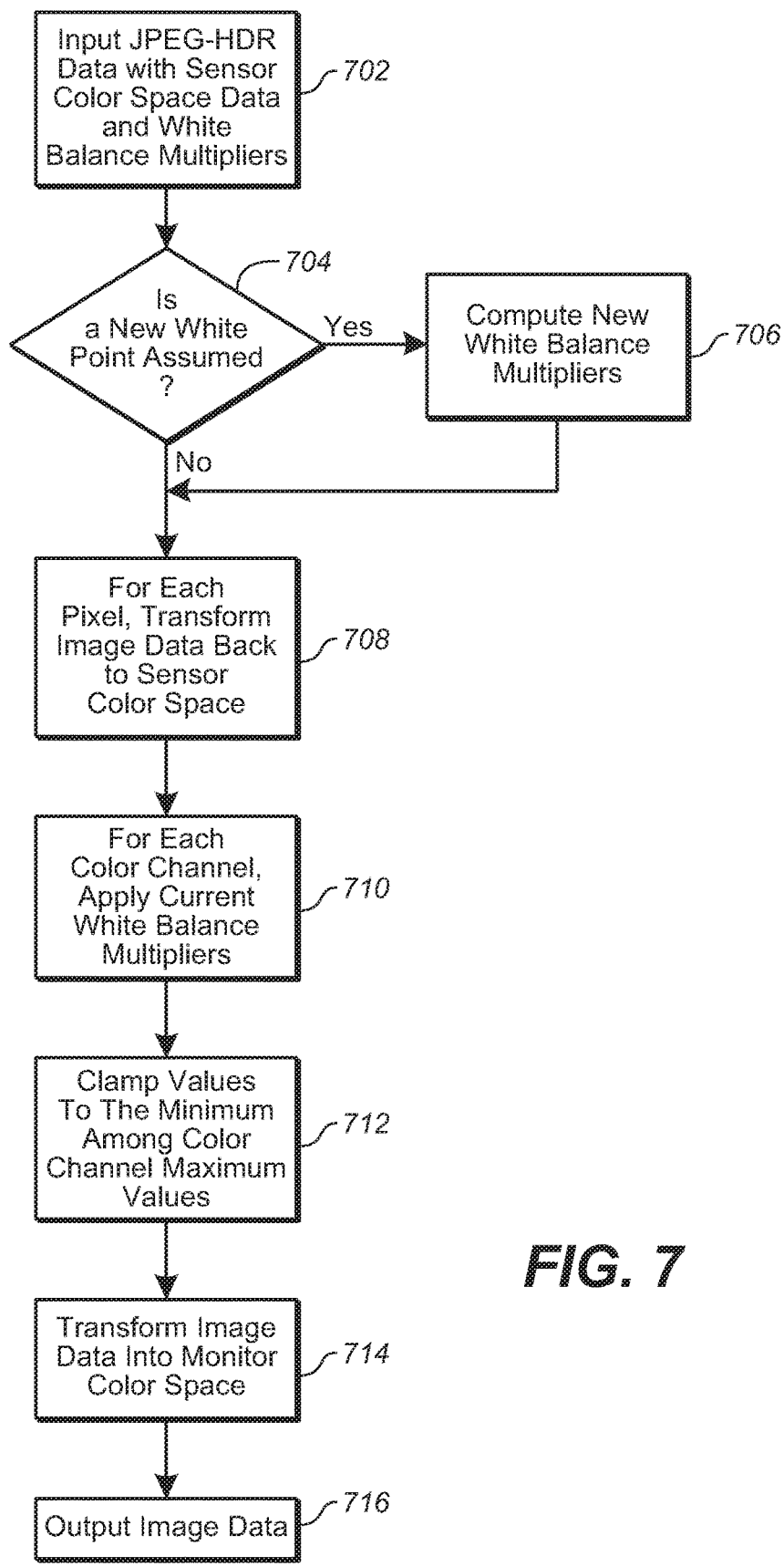
FIG. 7 is one embodiment of a white balance correction technique.

In yet another embodiment, White Balance 232 may be performed to affect a post-hoc white balance correction. FIG. 7 depicts one possible embodiment for the processing of HDR image data and adjusting the data to a proper white balance. At 702, the system inputs JPEG-HDR image data with any available sensor color space data and white balance multipliers. At 704, the system inquires (e.g. of the user or perhaps embedded in the image metadata) whether a new white point is assumed for the present image. If so, then new white balance multipliers are computed. Otherwise, the old white balance multipliers are used and the image data is transformed back to the sensor color space at 708. For each color channel, the current (either the old or the newly calculated) white balance multipliers are applied to the image data. If needed, image values are clamped to the minimum of the maximum (i.e. minmax) of the channel values at 712. At 714, the image data is transformed into the monitor color space. Thereafter, the image data is output at 716 as restored HDR RGB output.

In one embodiment, the white balance operation of FIG. 1 and FIGS. 6A and/or 6B in the encoder and the white balance operation of FIGS. 2 and 7 in the decoder may be implemented as paired operations, in which the white balance operation of the encoder works to affect proper white balance correction of the decoder. It should also be appreciated that the processing of FIG. 7 incorporates merely some of the features described in the present section and that many other features and/or refinements may be added.

5. EXAMPLE PROCESS FLOW

Figure 3A:
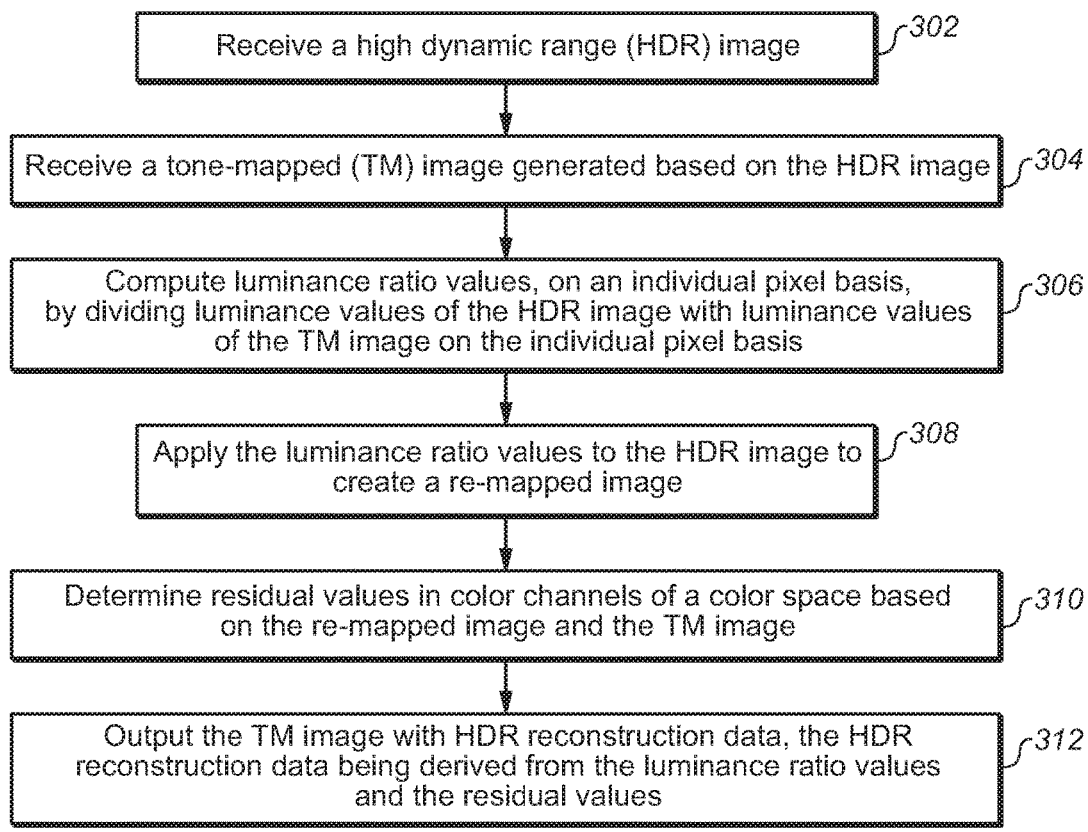
FIG. 3A and FIG. 3B illustrate example process flows, according to a possible embodiment of the present invention.

FIG. 3A illustrates an example process flow according to a possible embodiment of the present invention. In some possible embodiments, one or more computing devices or components such as an HDR image encoder (e.g., as shown in FIG. 1) may perform this process flow. The HDR image encoder may be implemented by adding one or more new processing blocks to and/or modifying one or more existing processing blocks in, a standard-based image encoder such as a JPEG image encoder. In block 302, the HDR image encoder receives a high dynamic range (HDR) image. In an example embodiment, the HDR image is one of a fixed-point image or a floating-point image. In an example embodiment, the HDR image is encoded in one of JPEG, JPEG-2000, MPEG, AVI, TIFF, BMP, GIFF, or another image format.

In block 304, the HDR image encoder also receives a tone-mapped (TM) image that was generated based on the HDR image. The TM image comprises one or more color alterations that are not recoverable from the TM image with a luminance ratio image. In an example embodiment, at least one of the one or more color alterations in the TM image is caused by one of clippings (e.g., in R, G, or B pixel values), or alterations of hues at one or more pixels.

In block 306, the HDR image encoder computes luminance ratio values, on an individual pixel basis, by dividing luminance values of the HDR image with luminance values of the TM image on the individual pixel basis.

In block 308, the HDR image encoder applies the luminance ratio values to the HDR image to create a re-mapped image.

In an example embodiment, the HDR image encoder converts at least one of the re-mapped image and the TM image from one color space to a different color space.

In block 310, the HDR image encoder determines residual values in color channels of a color space based on the re-mapped image and the TM image. If the original color is altered, at least one of the residual values is non-zero. In an example embodiment, the color space is an YCbCr color space; the color channels of the color space comprise a Cb color channel and a Cr color channel. The residual values in the color channels of the color space are calculated as differences between first pixel values, as derived from the re-mapped image, in the color channels and second pixel values, as derived from the TM image, in the color channels.

In block 312, the HDR image encoder outputs a version of the TM image with HDR reconstruction data. The HDR reconstruction data is derived from the luminance ratio values and the color-channel residual values.

In an example embodiment, the HDR reconstruction data comprises a residual image with quantized values derived from the luminance ratio values and the residual values in the color channels of the color space. The HDR reconstruction data may further comprise parameters specifying ranges of the quantized values.

In an example embodiment, the HDR reconstruction data is stored in an application segment of an image file with the TM image as a base image in the image file. In an example embodiment, the image file is in a JPEG-HDR format.

In an example embodiment, the HDR image encoder may perform one or more sanity checks on the HDR image, for example, before the HDR image is manipulated by a tone mapping operator (TMO) or a user. In an example embodiment, the HDR image encoder replaces zero, one, or more color-channel zero-values in the TM image with values smaller than a threshold value. This threshold value may be 1, 2, 3, . . . , 10, 11, etc. in various possible embodiments.

In an example embodiment, any tone mapping operations with any TMO and/or any color alterations on any number of pixels in the TM image may be performed in the process of generating the TM image.

In an example embodiment, the HDR image encoder applies a color space conversion to at least one of the HDR image, the TM image, or the re-mapped image.

In an example embodiment, luminance residual values between the TM image and the re-mapped image are all zeros. For example, in a color space (e.g., YUV) with a luminance channel (e.g., Y) and two color channels (e.g., Cb and Cr), differences in luminance values between the TM image and the re-mapped image (e.g., already, or alternatively after a color space conversion, in the color space) may be all zeros.

Figure 3B:
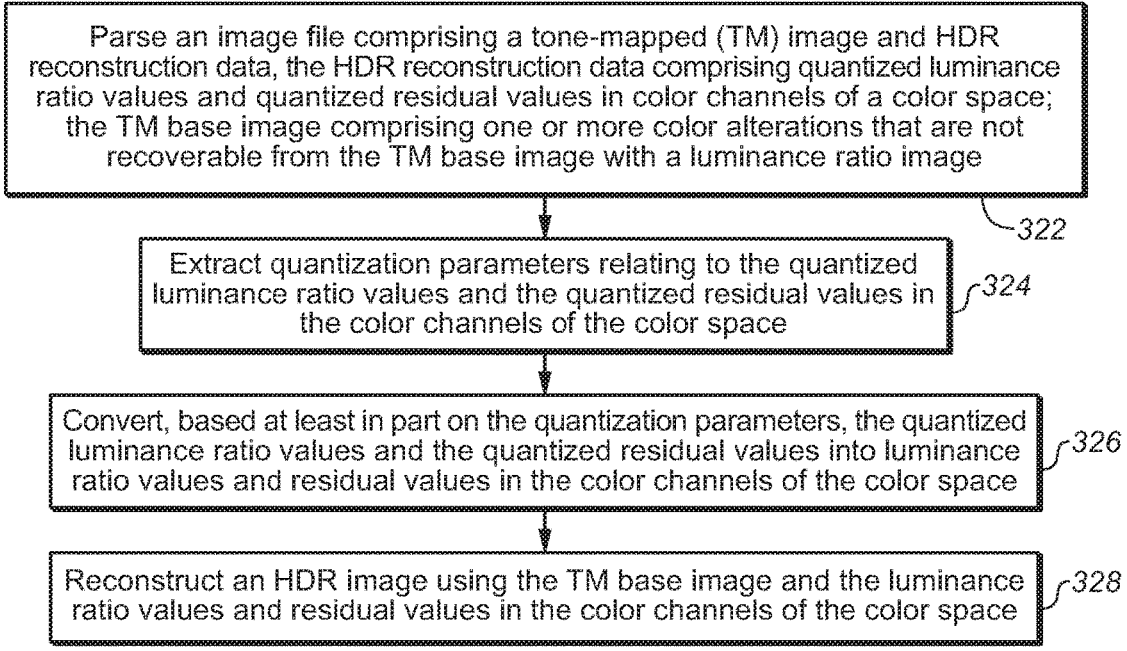

FIG. 3B illustrates an example process flow according to a possible embodiment of the present invention. In some possible embodiments, one or more computing devices or components such as an HDR image decoder (e.g., as shown in FIG. 2) may perform this process flow. The HDR image decoder may be implemented by adding one or more new processing blocks to and/or modifying one or more existing processing blocks in, a standard-based image decoder such as a JPEG image decoder. In block 322, the HDR image decoder parses an image file comprising a tone-mapped (TM) image and HDR reconstruction data. In an example embodiment, the TM base image comprises results of any tone mapping operations with any tone mapping operator and/or any color alterations on any number of pixels. In an example embodiment, the HDR reconstruction data comprises quantized luminance ratio values (e.g., Y channel) and quantized residual values in color channels (e.g., Cb and Cr channels) of a color space (YUV). The TM base image comprises one or more color alterations that are not recoverable from the TM base image with a luminance ratio image. In an example embodiment, the image file is encoded in one of JPEG, JPEG-2000, MPEG, AVI, TIFF, BMP, GIFF, or another image format. In an example embodiment, the image file is parsed with a standard based image decoder, e.g., a JPEG decoder.

In block 324, the HDR image decoder extracts quantization parameters relating to the quantized luminance ratio values and the quantized residual values in the color channels of the color space.

In block 326, the HDR image decoder converts, based at least in part on the quantization parameters, the quantized luminance ratio values and the quantized residual values into luminance ratio values and residual values in the color channels of the color space. In an example embodiment, the quantized luminance ratios and the quantized residual values are stored in a residual image. In an example embodiment, the residual image and the TM base image are de-quantized and decompressed using a common procedure.

In block 328, the HDR image decoder reconstructs an HDR image using the TM base image and the luminance ratio values and residual values in the color channels of the color space. The HDR image may be either a fixed-point image or a floating-point image.

In an example embodiment, the HDR image decoder performs an action of a color space conversion, a gamma encoding, a gamma decoding, a downsampling, or an upsampling, for example, on at least one of the TM base image, the residual image, the HDR image, or an intermediate image.

6. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
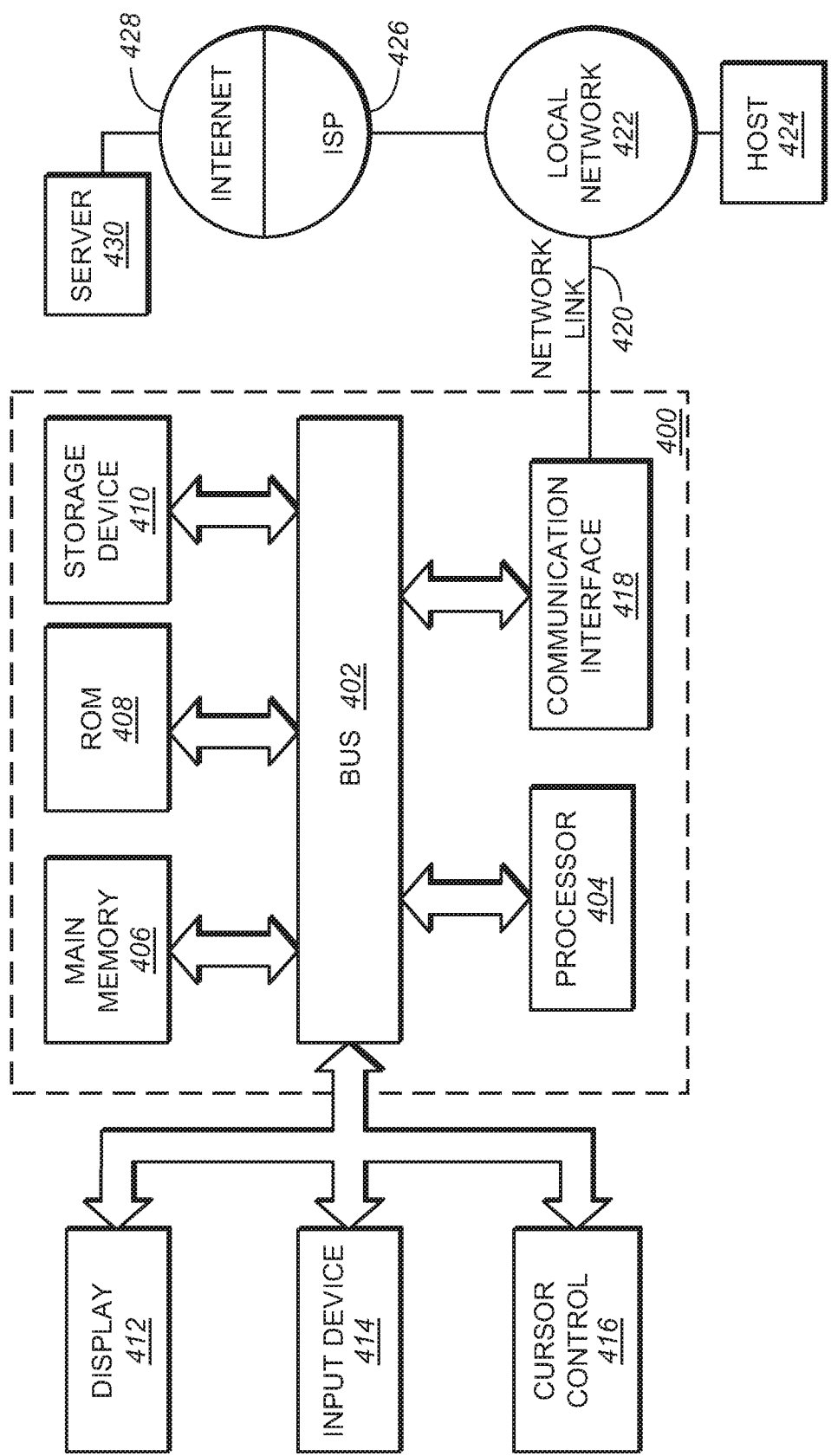
FIG. 4 illustrates an example hardware platform on which a computer or a computing device as described herein may be implemented, according a possible embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

For the purpose of illustration, it has been described that in some possible embodiments, HDR reconstruction data comprises quantized luminance ratios and quantized Cb and Cr residual values. In some possible embodiments, HDR reconstruction data may comprise non-quantized luminance ratios and/or Cb and Cr residual values, which may be, for example, floating-point or fixed-point values. For example, one or more application segments in an image file may store these non-quantized values. An HDR image decoder under techniques herein may parse the image file and retrieve the non-quantized values. These non-quantized values may be used to combine with a tone mapped base image extracted from the image file to reconstruct an HDR image.

For the purpose of illustration, it has been described that in some possible embodiments, possible preprocessing may include downsampling. In some possible embodiments, preprocessing herein may not perform downsampling for the purpose of maintaining image details and/or color precisions of HDR images being processed by techniques herein. For example, image coding of a HUV residual image may be performed by a JPEG image encoder with a mode that avoids downsampling.

For the purpose of illustration, it has been described that in some possible embodiments, a JPEG image file format and/or JPEG codec may be used in an HDR image encoder and/or decoder. For the purpose of the present invention, an image codec other than a JPEG codec may be used in an HDR image encoder and/or decoder.

For the purpose of illustration, it has been described that in some possible embodiments, an input HDR image and a tone-mapped base image are RGB images. For the purpose of the present invention, other types of images may be used to store an HDR image and a tone-mapped based image herein. For example, an input HDR image in a YUV color space may be used instead of in a RGB color space. Zero, one, or more color space conversions in the process of HDR image encoding or decoding may be implemented under techniques as described herein.

For the purpose of illustration, it has been described that in some possible embodiments, an HUV (or YUV) file in an YCbCr color space may be used to store luminance ratios and residual values other than luminance ratios. For the purpose of the present invention, other types of color spaces and other types of image files may be used to store equivalent information to the luminance ratios and residual values. For example, the luminance ratios and residual values may be converted to a different color space other than the YCbCr color space. Similarly, an image file other than the YUV file may be used to store values converted from the luminance ratios and residual values. In some possible embodiments, reversible transformations may be used to perform a color space conversion or pixel value conversions under techniques as described herein.

In some possible embodiments, an image file comprising a tone mapped base image with luminance ratio and Cb and Cr residual values has a file size similar to that of another image file comprising a tone mapped base image with luminance ratio but without Cb and Cr residual values. In a particular embodiment, images with the Cb and Cr residual values are on average only 10% larger than counterpart images without Cb and Cr residual values.

For the purpose of illustrations only, a tone mapped image is generated by a TMO. For the purpose of the present inventions, more than one TMOs may be used together to generate a tone mapped image as described herein.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A processor non-transitory readable medium having stored thereon an image file structure for representing a high dynamic range image in a compressed format, the image file structure comprising:
   a compressed tone-mapped image in a standard-based compression format; and
   high dynamic range (HDR) reconstruction data, wherein the HDR reconstruction data comprise:
      a quantized luma ratio image comprising log ratio pixel values;
      luma de-quantization parameters for the quantized log ratio pixel values;
      one or more sets of quantized residual chroma values; and
      chroma de-quantization parameters for the one or more sets of quantized residual chroma values, wherein the compressed tone-mapped image is separated by the HDR reconstruction data using one or more application markers.

2. The processor non-transitory readable medium of claim 1, wherein the log ratio pixel values represent the logarithm of dividing, on an individual pixel basis, luminance values of an HDR input image with luminance values of an uncompressed version of the compressed tone-mapped image.

3. The processor non-transitory readable medium of claim 1, wherein the luma de-quantization parameters comprise a minimum log ratio pixel value and a maximum log ratio pixel value.

4. The processor non-transitory readable medium of claim 1, wherein the chroma de-quantization parameters comprise a minimum residual chroma pixel value ($Cb_{min}$) and a maximum residual chroma pixel value ($Cb_{max}$).

5. The processor non-transitory readable medium of claim 2, wherein the compressed tone-mapped image comprises a compressed tone-mapped image generated from the HDR input image.

6. The method of claim 1 wherein the standard-based compression format is the JPEG format.

7. A method for decoding high-dynamic range images with a processor, the method comprising:
   receiving a coded bitstream comprising a high-dynamic range image encoded according to the file structure in claim 1;
   parsing the coded bitstream to extract the compressed tone-mapped image and the HDR reconstruction data;

generating a decoded base image based on the compressed tone-mapped image;
extracting the luma de-quantization parameters from the HDR reconstruction data;
extracting the quantized luma ratio image;
generating a dequantized luma ratio image based on the quantized luma ratio image and the luma de-quantization parameters;
extracting the chroma de-quantization parameters;
extracting the one or more sets of quantized residual chroma values;
generating one or more sets of dequantized residual chroma values based on the chroma de-quantization parameters and the one or more sets of quantized residual chroma values;
linearizing the dequantized luma ratio image to generate a linearized luma ratio image; and
generating an output HDR image based on the one or more sets of dequantized residual chroma values, the linearized luma ratio image, and the decoded base image.

8. The method of claim 7 wherein generating the output HDR image further comprises:
generating an intermediate image by adding the one or more sets of dequantized residual chroma values to the decoded base image; and
generating the output HDR image by multiplying the intermediate image with the linearized luma ratio image.

9. The method of claim 7, wherein given a quantized log ratio pixel value H, a corresponding unquantized log ratio luma value lr is determined as $$lr = H\left(\frac{lr_{max} - lr_{min}}{255}\right) + lr_{min},$$

wherein $lr_{min}$ denotes a minimum log ratio pixel value luma de-quantization parameter and $lr_{max}$ denotes a maximum log ratio pixel value luma de-quantization parameter.

10. The method of claim 7, wherein given a quantized residual chroma pixel value U, a corresponding intermediate residual chroma pixel value Cb is determined as $$Cb = U\left(\frac{Cb_{max} - Cb_{min}}{255}\right) + Cb_{min},$$

wherein $Cb_{min}$ denotes a minimum residual chroma pixel value chroma de-quantization parameter and $Cb_{max}$ denotes a maximum residual chroma pixel value chroma de-quantization parameter.

11. The method of claim 7, wherein linearizing the dequantized luma ratio image comprises applying an inverse logarithm function to pixels of the dequantized luma ratio image.

12. The method of claim 7, further comprising applying a color space conversion and gamma decoding to the decoded base image to generate a gamma-decoded base image; and
generating the output HDR image based on the one or more sets of dequantized residual chroma values, the linearized luma ratio image, and the gamma-decoded base image.

13. The method of claim 12, further comprising applying a color space conversion to the dequantized residual chroma values to generate color-transformed residual chroma values; and
generating the output HDR image based on the one or more sets of color-transformed residual chroma values, the linearized luma ratio image, and the gamma-decoded base image.

* * * * *